United States Patent [19]

Inagaki, deceased et al.

[11] Patent Number: 5,392,150
[45] Date of Patent: Feb. 21, 1995

[54] OPTICAL INFORMATION READING DEVICE

[75] Inventors: Masahiro Inagaki, deceased, late of Aichi, by Atsuko Inagaki, legal representative; Kenzo Obata, Aichi, all of Japan

[73] Assignee: Nippondenso Co., Ltd., Kariya, Japan

[21] Appl. No.: 883,873

[22] Filed: May 15, 1992

[30] Foreign Application Priority Data

May 15, 1991 [JP] Japan ................... 3-110412
Jul. 16, 1991 [JP] Japan ................... 3-175575

[51] Int. Cl.$^6$ ............................................. G06K 7/10
[52] U.S. Cl. ................... 359/221; 359/213; 235/462
[58] Field of Search ............. 359/213, 214, 221, 224; 235/456, 462, 467

[56] References Cited

U.S. PATENT DOCUMENTS

| | | | |
|---|---|---|---|
| 4,463,251 | 7/1984 | Koutonen et al. | 235/467 |
| 4,801,788 | 1/1989 | Osaka | 235/462 |
| 4,845,349 | 7/1989 | Cherry | 235/462 |
| 5,019,764 | 5/1991 | Chang | 235/462 |
| 5,115,120 | 5/1992 | Eastman | 235/462 |
| 5,151,580 | 9/1992 | Metlitsky et al. | 235/467 |
| 5,212,371 | 5/1993 | Boles et al. | 235/462 |
| 5,231,277 | 7/1993 | Aritake et al. | 235/462 |

FOREIGN PATENT DOCUMENTS

| | | | |
|---|---|---|---|
| 366899 | 5/1990 | European Pat. Off. | |
| 94382 | 4/1988 | Japan | 235/462 |
| 63-269263 | 11/1988 | Japan | |
| 195406 | 8/1989 | Japan | 359/224 |
| 2178888 | 7/1990 | Japan | |
| 99381 | 4/1991 | Japan | 235/462 |

*Primary Examiner*—Edward K. Look
*Assistant Examiner*—F. Daniel Lopez
*Attorney, Agent, or Firm*—Cushman, Darby & Cushman

[57] ABSTRACT

A crystal resonant scanner has a scanning mirror which is cyclically reciprocally oscillatable for reflecting and deflecting a laser beam emitted by a laser beam source to scan an optically detectable pattern of information such as a bar code. A concave mirror is fixed in position for converging a light beam reflected off the optically detectable pattern upon scanning the optically detectable pattern with the light beam reflected by the scanning mirror. The concave mirror has a hole defined substantially centrally therein, and the scanning mirror is positioned in the hole. The light beam converged by the concave mirror is detected by a photodetector. The laser beam source and the photodetector are positioned in front of the scanning mirror and the concave mirror. The photodetector produces an electric signal indicative of the intensity of the detected light beam. The produced electric signal is supplied to an electric signal processing system which produces sampled values of the electric signal and reads the optically detectable pattern based on the sampled values.

26 Claims, 13 Drawing Sheets

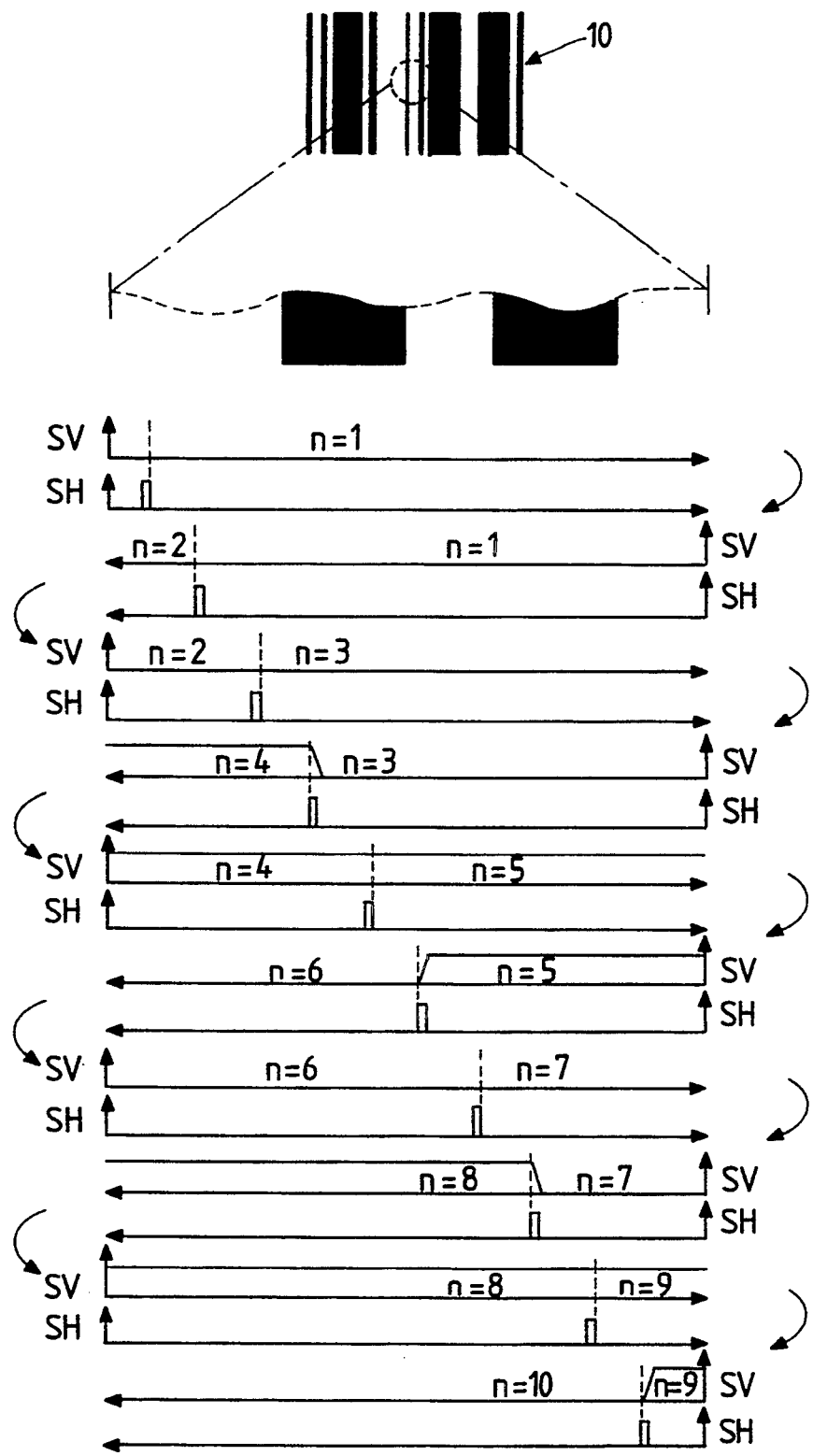

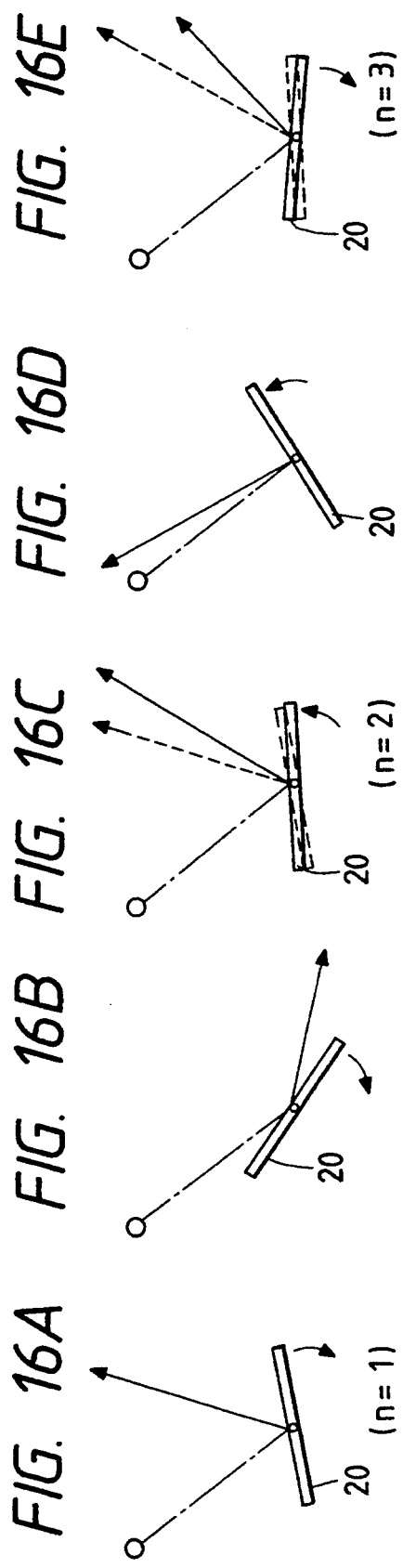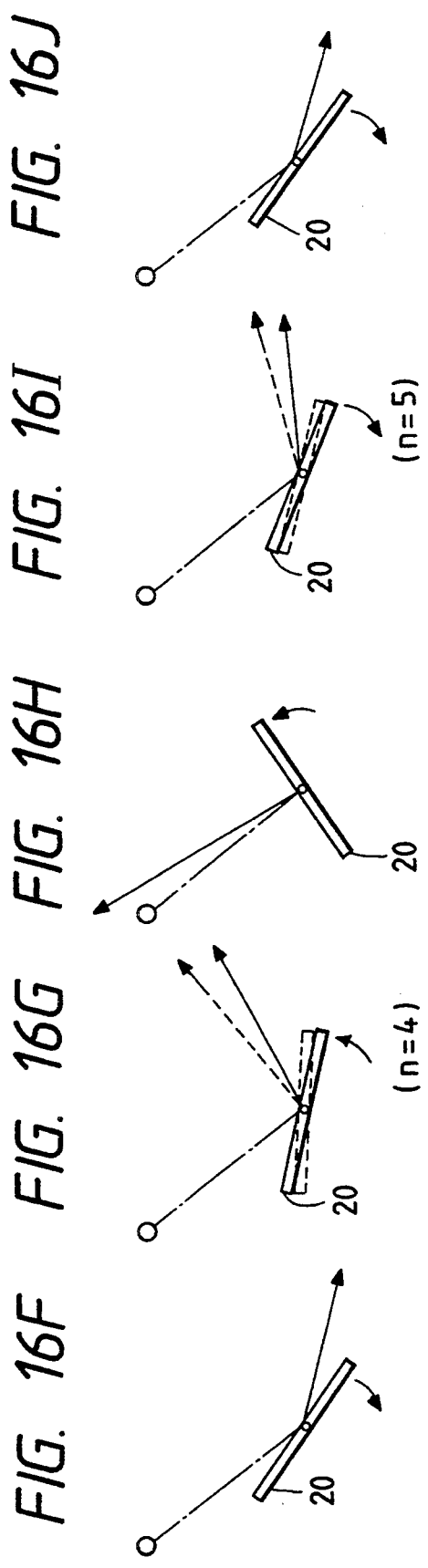

OPTICAL INFORMATION READING DEVICE

BACKGROUND OF THE INVENTION

1. Field of the Invention

The present invention relates to an optical information reading device for reading optical information such as a bar code with a light beam such as a laser beam that is caused to scan the optical information by a torsion resonator that resonates at its own resonating frequency in a self-resonating mode.

2. Description of the Prior Art

Optical information reading devices, such as bar code readers, are known. The optical system of one such known bar code reader is shown in FIG. 1 of the accompanying drawings. AS shown in FIG. 1, a laser beam emitted by a laser beam source 81 is directed through a semireflecting mirror 87 to a polygonal mirror 83. The polygonal mirror 83, which rotates about its own axis at a constant speed, reflects and deflects the laser beam to scan a bar code label 85 printed with a bar code of any of various standards such as the UPC (Universal Product Code) bar code, Code 39, ITF (Interleaved 2 of 5), etc. The bar code label 85 reflects off the applied laser beam back to the polygonal mirror 83, which also reflects the reflected laser beam to the semireflecting mirror 87. The semireflecting mirror 87 directs the reflected laser beam through a condensing lens 89 toward a photodetector 91. The bar code reader shown in FIG. 1 is disclosed in Japanese laid-open patent publication No. 63-269263, for example.

The laser beam that is applied from the laser beam source 81 to the polygonal mirror 83 and the reflected laser beam that travels from the polygonal mirror 83 to the photodetector 91 are separated from each other by the semireflecting mirror 87. Therefore, the optical system of the bar code scanner is relatively large in size, making it difficult to reduce the overall size of the bar code scanner.

Japanese laid-open patent publication No. 2-178888 discloses another bar code reader which has a scanning mirror for applying a laser beam from a laser beam source to a bar code label, and a converging mirror for directing a laser beam reflected by the bar code label toward a photodetector. The scanning mirror and the converging mirror are reciprocally angularly moved about a common axis by a step motor or the like.

Since the laser beam source and the photodetector can be disposed in substantially the same position, the optical system of the bar code reader can be simpler than that of the bar code reader with the semireflecting mirror. As a result, the bar code reader can be reduced in side and weight.

However, since the single motor is employed to angularly move the scanning mirror and the converging mirror, a relatively large load is imposed on the motor, and hence the motor cannot be reduced in size. The large load on the motor results in a relatively large electric power requirement for the motor.

*Quartz Light Scanner For Laser Printer*, written by Sugiyama et al. Preprint for 28th SICE Scientific Lecture Meeting, pages 581~582, 1989, discloses a crystal resonant scanner using a torsion resonator. The disclosed resonant scanner is shown in FIG. 2 of the accompanying drawings. As shown in FIG. 2, the resonant scanner, generally denoted at 60, has a torsion resonator 58 composed of a mirror 50, a coil unit 52 with a coil (not shown) formed thereon, a torsion bar 54, and a fixed support 56, the torsion resonator 58 being made of crystal by photolithography and anisotropic etching. The resonant scanner 60 also has a pair of spaced magnets 59a, 59b for applying a magnetic field to the coil unit 52 disposed between the magnets 59a, 59b for thereby torsionally vibrating the torsion resonator 58 back and forth in the directions indicated by the arrows A.

A laser beam emitted from a laser beam source 62 is applied through a collimator lens 64 to the mirror 50 which, when vibrated back and forth, deflects the applied laser beam to scan a desired surface such as a bar code label 66. When the coil of the coil unit 52 is supplied with an alternating electric current of a certain frequency, the laser beam reflected by the mirror 50 scans the bar code label 66 periodically at the frequency of the electric current supplied to the coil unit 52. Inasmuch as the resonant scanner 60 employs no electric motor, the resonant, scanner 60 may be smaller in size and weight and consumes a reduced amount of electric energy. If the frequency of the electric current supplied to the coil unit 52 is selected to be equal or close to the resonant frequency of the torsion resonator 58, then the torsion resonator 58 can resonate at its resonant frequency, resulting in a much lower power requirement than the conventional motor-driven light beam scanners. The resonant scanner 60 is suitable for use as a hand-held, portable optical information reader.

As shown in FIG. 2, a laser beam reflected by the bar code label 66 is applied through a condensing lens 68 to a photodetector 70, which produces an electric signal representative of the intensity of the laser beam falling on the photodetector 70. The electric signal generated by the photodetector 70 is then supplied to an electric signal processing system. More specifically, the electric signal from the photodetector 70 is amplified by an amplifier 72 into an amplified signal, which is then converted into a binary signal by a binary signal converter 74. The binary signal is decoded by a decoder 78 into a decoded signal that is sent to an output terminal 79. The coil of the coil unit 52 is energized by a mirror driver 80 for turning the mirror 50 back and forth to deflect the laser beam. The laser beam source 62 is energized by a laser driver 82. The decoder 78, the mirror driver 80, and the laser driver 82 are controlled by a controller 84. The decoder 78 and the controller 84 are in the form of an electronic control unit comprising a microcomputer having a CPU, a ROM, and a RAM.

The resonant frequency of the torsion resonator 58 is relatively high. Therefore, when the torsion resonator 58 is caused to resonate at its resonant frequency, i.e., in a self-resonating mode, the resonant scanner 60 scans the bar code label 66 at a very high rate, at least ten times the scanning rate of the conventional light scanner with a polygonal mirror. According to *Quartz Light Scanner For Laser Printer*, referred to above, the torsion resonator 58 has a resonant frequency of 840 Hz, and the scanning rate of the resonant scanner 60 in the self-resonating mode is about 1600 scans per second. The high scanning rate requires the signal processing system to have a high signal processing capability.

In reality, the controller 84 controls the mirror driver 80 to supply the coil unit 52 with an electric current of a frequency that is selected to oscillate the torsion resonator 58 at a frequency lower than the resonant frequency thereof. In such a modes however, the resonant scanner 60 consumes more electric power than in the self-resonating mode, cancelling out the advantages offered by the torsion resonator 58.

The resonant frequency of the torsion resonator 58 may be lowered when the mirror 50 is increased in size and weight. An increase in the size and weight of the mirror 50 causes the resonant scanner 60 to be larger in size, and necessitates an increased cost for the manufacture of the torsion resonator 58. The large-size mirror 50 is also susceptible to external shocks. For these reasons, the size of the mirror 50 cannot be increased for the purpose of lowering the resonant frequency of the torsion resonator 58.

More specifically, the impedance Zs and resonant frequency fo of the resonant scanner 670 are expressed as follows:

$$Zs = RDC + \frac{C^2}{r + i(\omega \cdot j - k/\omega)} \quad (1)$$

$$fo = \frac{1}{2 \cdot \pi} \cdot \sqrt{k/j} \quad (2)$$

where RDC is the resistance of the coil, r is the damping coefficient, C is the torque coefficient, j is the moment of inertia, and k is the torsion spring constant.

The torsion spring constant k is determined by the torsion bar 54 of the torsion resonator 58, and the moment j of inertia by the size and weight of the mirror 50. Therefore, if the torsion bar 54 remains unchanged, the resonant frequency fo can be lowered when the size and weight of the mirror 50 are increased. As described above, if the mirror 50 is increased in size and weight, then the resonant scanner 60 is increased in size, and the torsion resonator 58 is manufactured at an increased cost. The large-size mirror 50 is susceptible to external shocks.

SUMMARY OF THE INVENTION

In view of the aforesaid drawbacks of the conventional optical information reading devices, it is an object of the present invention to provide an optical information reading device having a torsion resonator Chat resonates at its own resonating frequency in a self-resonating mode, so that the optical information reading device can read desired optical information at a high scanning rate.

According to the present invention, there is provided an optical information reading device comprising light emitting means for emitting a light beam, swingable means angularly movable for reflecting and angularly deflecting the light beam emitted from the light emitting means to produce a scanning light beam to scan optical information, condensing means, fixed in position, for converging a light beam which is reflected off the optical formation upon application of the scanning light beam to the optical information, and reading means for reading the optical information based on the intensity of the reflected light beam converged by the condensing means.

According to the present invention, there is also provided an optical information reading device comprising light emitting means for emitting a light beam, a scanning mirror for reflecting the light beam emitted by the light emitting means toward optical information, driving means for angularly moving the scanning mirror periodically in a predetermined direction for deflecting the reflected light beam to produce a scanning light beam, a condensing mirror for converging a light beam which is reflected off the optical information upon application of the scanning light beam to the optical information, light detecting means for detecting the reflected light beam converged by the condensing mirror and producing a detected signal representing the intensity of the detected reflected light beam, and reading means for reading the optical information based on the detected signal produced by the light detecting means, the light emitting means and the light detecting means being positioned in front of the condensing mirror, the condensing mirror having an optical path for introducing the light beam from the light emitting means to the scanning mirror and for allowing the light beam reflected off the scanning-mirror to travel toward the optical information.

According to the present invention, there is further provided an optical system for optically scanning an optically detectable pattern of information with a light beam and detecting a light beam reflected off the optically detectable pattern, comprising light emitting means for emitting a light beam, a first mirror cyclically reciprocally oscillatable for reflecting and deflecting the light beam emitted by the light emitting means to scan the optically detectable pattern, a second mirror fixed in position for converging a light beam reflected off the optically detactable pattern upon scanning the optically detectable pattern with the light beam reflected by the first mirror, the second mirror having a hole defined substantially centrally therein, the first mirror being positioned in the hole, and light detecting means for detecting the light beam converged by the second mirror.

According to the present invention, there is further provided a device for reading an optically detectable pattern of information, comprising light emitting means for emitting a light beam, scanning means cyclically reciprocally angularly oscillatable for angularly deflecting the light beam emitted from the light emitting means to produce a scanning light beam to scan the optically detectable pattern, light detecting means for detecting a light beam which is reflected off the optically detectable pattern upon application of the scanning light beam to the optically detectable pattern, and producing an electric signal indicative of the detected light beam, and electric signal processing means for producing sampled values of the electric signal produced by the detecting means and reading the optically detectable pattern based on the sampled values.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 15 is a diagram showing a sequence of sampling signals generated by the sampling timing generator in successive scanning strokes, and the manner in which bar code signals are sampled by a sample-and-hold circuit in response to the sampling signals; and FIG. 16A through 16J are diagrams illustrative of angular movements of a mirror of a torsion resonator of the bar code reader shown in FIG. 11.

DETAILED DESCRIPTION OF THE PREFERRED EMBODIMENTS

Figure 3:
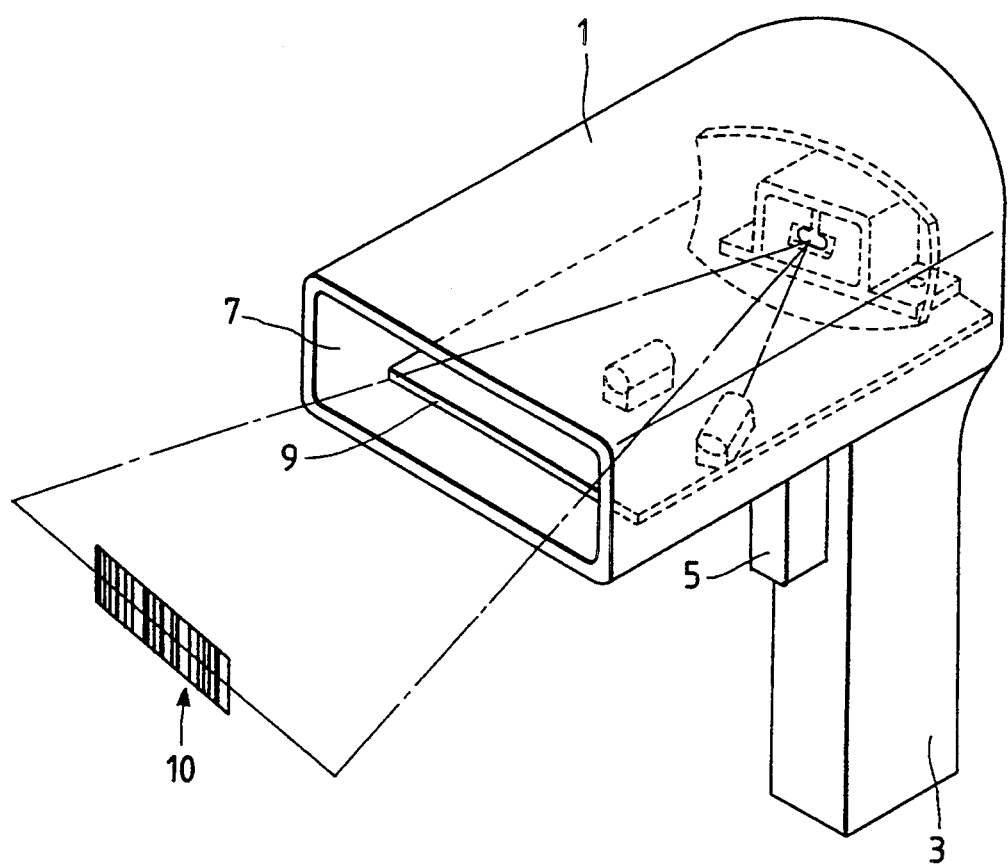
FIG. 3 is a perspective view of a bar code reader as an optical information reading device according to an embodiment of the present invention.

FIG. 3 shows an optical information reading device according an embodiment of the present invention. The optical information reading device is in the form of a small-size, lightweight, hand-held portable bar code reader for reading a bar code of any of various designs, e.g., the UPC (Universal Product Code) bar code, Code 39, ITF (Interleaved 2 of 5), etc.

As shown in FIG. 3, the bar code reader comprises a casing 1 housing an optical system (described later on) and a grip 3 projecting downwardly from the casing 1 for being gripped by the user when in use. The grip 3 is combined with a trigger switch 5 which, when turned on by the index finger, for example, of the user, generates a command signal to enable the bar code reader to read a bar code on a bar code label 10. The casing 1, the grip 3, and the trigger switch 5 are preferably molded of a plastic material that is lightweight and highly resistant to shocks.

The casing 1 has a window 7 defined in a front end thereof for emitting a light beam from the optical system in the casing 1 toward the bar code label 10 and introducing a reflected light beam from the bar code label 10 into the optical system. The window 7 is fitted with a transparent panel of plastic or glass for protecting the optical system and various electronic components associated therewith against dust and other foreign matter. The transparent panel of plastic or glass is inclined to the optical system in the casing 1 at a certain angle such that the laser beam applied to the transparent panel of plastic or glass will not be fully reflected thereby.

The casing 1 also houses therein a circuit board 9 on which there are mounted various electric circuits (described later on) including drivers for actuating the optical system in response to the command signal from the trigger switch 5 and a signal processing system for reading the bar code based from the laser beam reflected by the bar code. The optical system is composed of various optical components that are also mounted on the circuit board 9.

Figure 4:
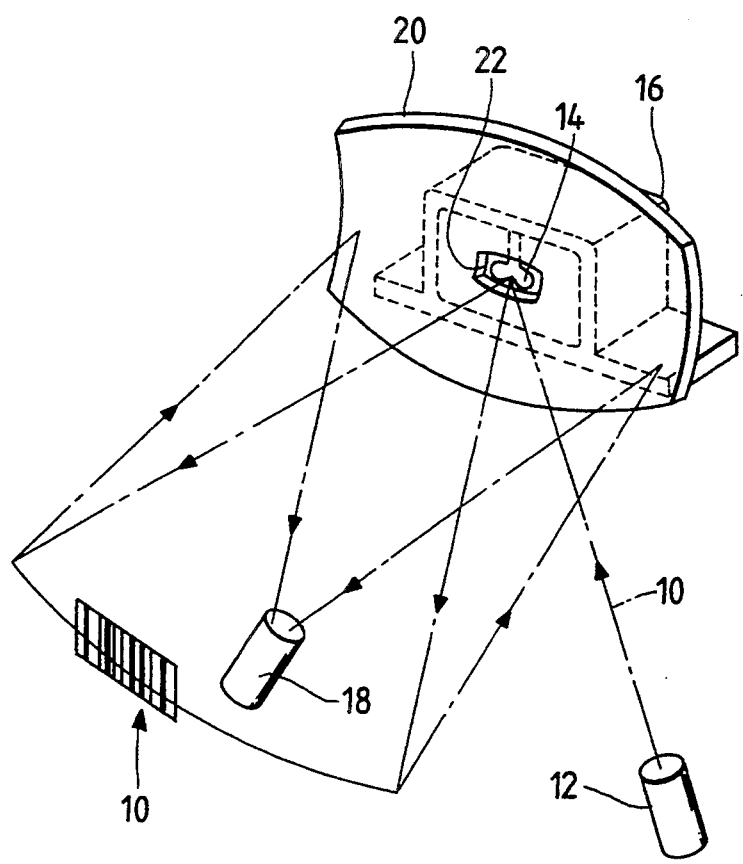
FIG. 4 is a schematic perspective view of an optical system of the bar code reader shown in FIG. 3.

As shown in FIG. 4, the optical system housed in the casing i comprises a laser beam source 12 for emitting a laser beam 10, a crystal resonant scanner 16 having a scanning mirror 14 for reflecting the laser beam 10 from the laser beam source 12 out of the casing 1 through the window 7, a photodetector 18 for detecting and converting a reflected laser beam into an electric signal corresponding to the intensity of the detected laser beam, and a concave mirror 20 for converging the divergent laser beam reflected from the bar code label 10 onto the photodetector 18.

The laser beam source 12 comprises a laser beam emitter such as a laser diode, an He—Ne laser, or the like, a focusing lens in the form of a plano-convex lens, and an aperture. The laser beam source 12 applies the laser beam to the center of the scanning mirror 14. The photodetector 18 comprises a photodetector element such as a photodiode, a phototransistor, or the like, and an optical filter which passes only an electromagnetic radiation having the same wavelength as that of the laser beam emitted by the laser beam source 12. If the laser beam emitter is a laser diode, the optical filter passes an electromagnetic radiation having a wavelength of 670 nm, and if the laser beam emitter is an He—Ne laser, the optical filter passes an electromagnetic radiation having a wavelength of 630 nm.

The laser beam source 12 and the photodetector 18 are mounted on the circuit board 9 in front of the concave mirror 20 that is fixed to the upper surface of the circuit board 9. The laser beam source 12 and the photodetector 18 are electrically connected to the signal processing system on the circuit board 9. The concave mirror 20 has a small hole 22 defined centrally therein as an optical path for allowing the laser beam from the laser beam source 12 to pass therethrough to the scanning mirror 14 of the resonant scanner 16 that is positioned behind the concave mirror 20, and also for allowing the laser beam reflected by the scanning mirror 14 to travel therethrough toward the window 7 (FIG. 3).

Figure 5:
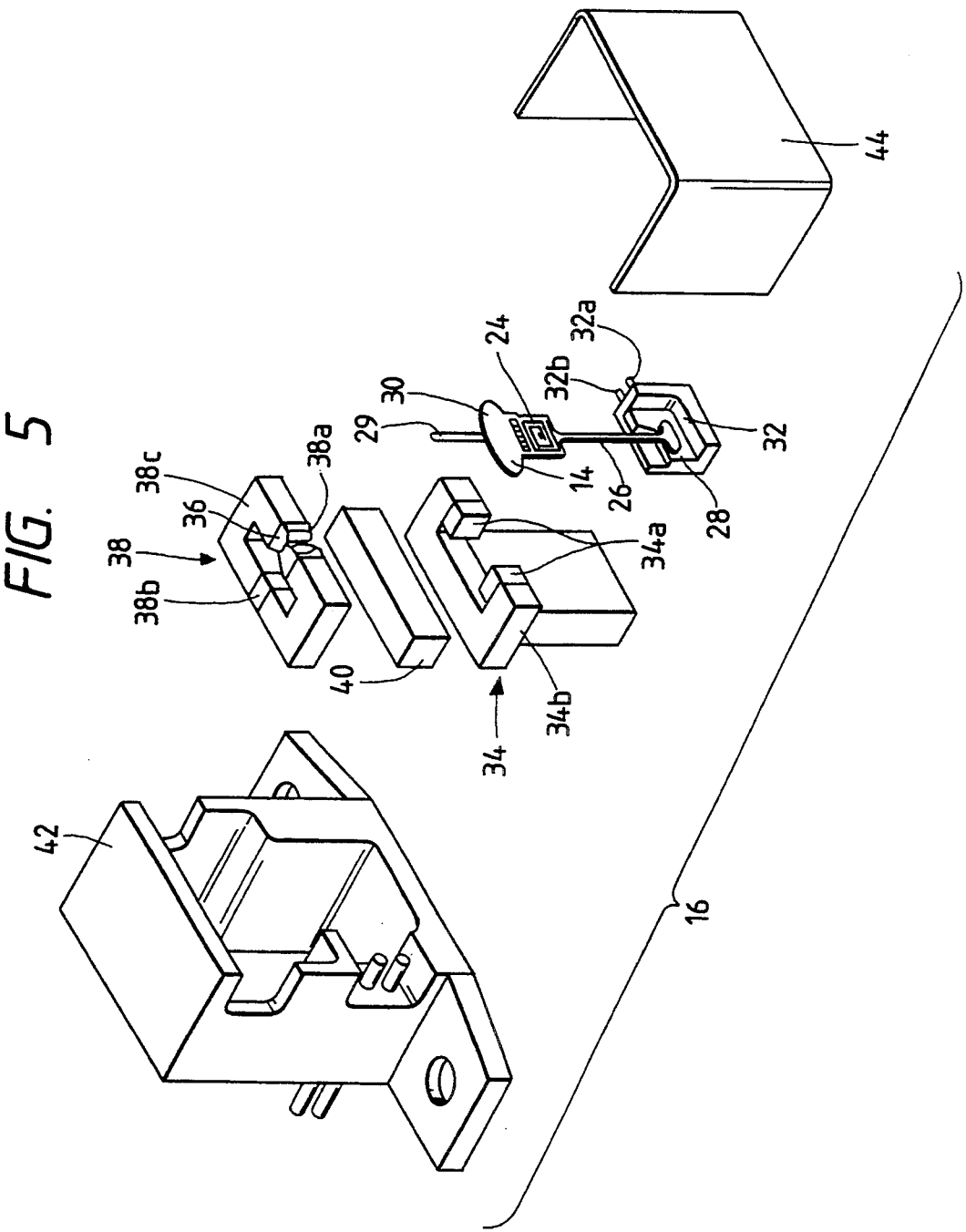
FIG. 5 is an exploded perspective view of a resonant scanner of the bar code reader shown in FIG. 4.

The crystal resonant scanner 16 is illustrated in detail in FIG. 5. Basically, the crystal resonant scanner 16 functions in the same manner as the conventional crystal resonant scanner 60 shown in FIG. 2.

As shown in FIG. 5, the resonant scanner 16 includes a unitary torsion resonator or vibrator 30 which comprises the scanning mirror 14, a coil 24 positioned beneath the scanning mirror 14, a torsion spring bar 26 coupled to and extending downwardly from the coil 24, a fixed support 28 on the lower end of the torsion spring bar 26, and an upper support finger 29 coupled to and extending upwardly from the scanning mirror 14. The torsion resonator 30 is made of crystal by photolithography and anisotropic etching. The scanning mirror 14 is coated with a thin film of gold to provide a reflectance of about 90% with respect to the laser beam emitted from the laser beam source 12.

The resonant scanner 16 also has a support block 32, a first magnetic circuit assembly 34, a magnetic fluid 36, a second magnetic circuit assembly 38, and an aluminum shield block 40. The fixed support 28 is fixedly supported by the support block 32. The first magnetic circuit assembly 34 comprises a pair of laterally spaced permanent magnets 34a and a yoke 34b supporting the permanent magnets 34a, for applying a magnetic field to the coil 24 to cause the torsion resonator 30 to oscillate or vibrate torsionally about vertical axis. The upper support finger 29 is supported by the magnetic fluid 36 which absorbs vibrations other than the torsional vibration of the torsion resonator 30. The magnetic fluid 36 is contained by a container 38a. The second magnetic circuit assembly 38 comprises the container 38a, a permanent magnet 38b, and a yoke 38c, the permanent magnet 38b and the yoke 38c magnetically holding the container 38a and hence the-magnetic fluid 36 in position. The first and second magnetic circuit assemblies 34, 38 are magnetically shielded from each other by the aluminum shield block 40 that is positioned vertically between the first and second magnetic circuit assemblies 34, 38. The torsion resonator 30, the support block 32, the first magnetic circuit assembly 34, the magnetic fluid 36, the second magnetic circuit assembly 38, and the aluminum shield block 40 are accommodated in a case composed of a housing 42 and a cover 44.

The support block 32 has two electric terminals 32a, 32b electrically connected to the coil 24. When an alternating electric current of a certain frequency and magnitude is supplied to the coil 24 through the terminals 32a, 32b, the torsion resonator 30 torsionally oscillates or vibrates at the same frequency through an angular range corresponding to the amplitude of the supplied electric current. The resonant scanner 16 is therefore a resonant galvanometric scanner using crystal as an elastic material. When a constant high-frequency current is supplied to the coil 24, the resonant scanner 16 scans the bar code label 10 at a stable frequency. The resonant scanner 16 does not suffer much aging due to the fatigue of the material thereof.

As shown in FIG. 4, the laser beam 10 emitted from the laser beam source 12 falls on the scanning mirror 14 of the resonant scanner 16 behind the concave mirror 20, and is reflected by the scanning mirror 14 to travel out of the casing 1 through the window 7. The laser beam emitted from the window 7 is applied to the bar code label 10, and is reflected thereby. The reflected laser beam from the bar code label 10, which bears information represented by the bar code on the bar code label 10, is applied to the concave mirror 20 and reflected and converged thereby toward the photodetector 18. When the coil 24 is energized with an alternating electric current of a certain frequency and magnitude, therefore, the laser beam from the laser beam source 12 which falls on the scanning mirror 14 is deflected thereby at the frequency of the supplied electric current, thereby scanning the bar code label 10. The bar code printed on the bar code label 10 can thus be read based on the electric signal generated by the photodetector 18.

Figure 1:
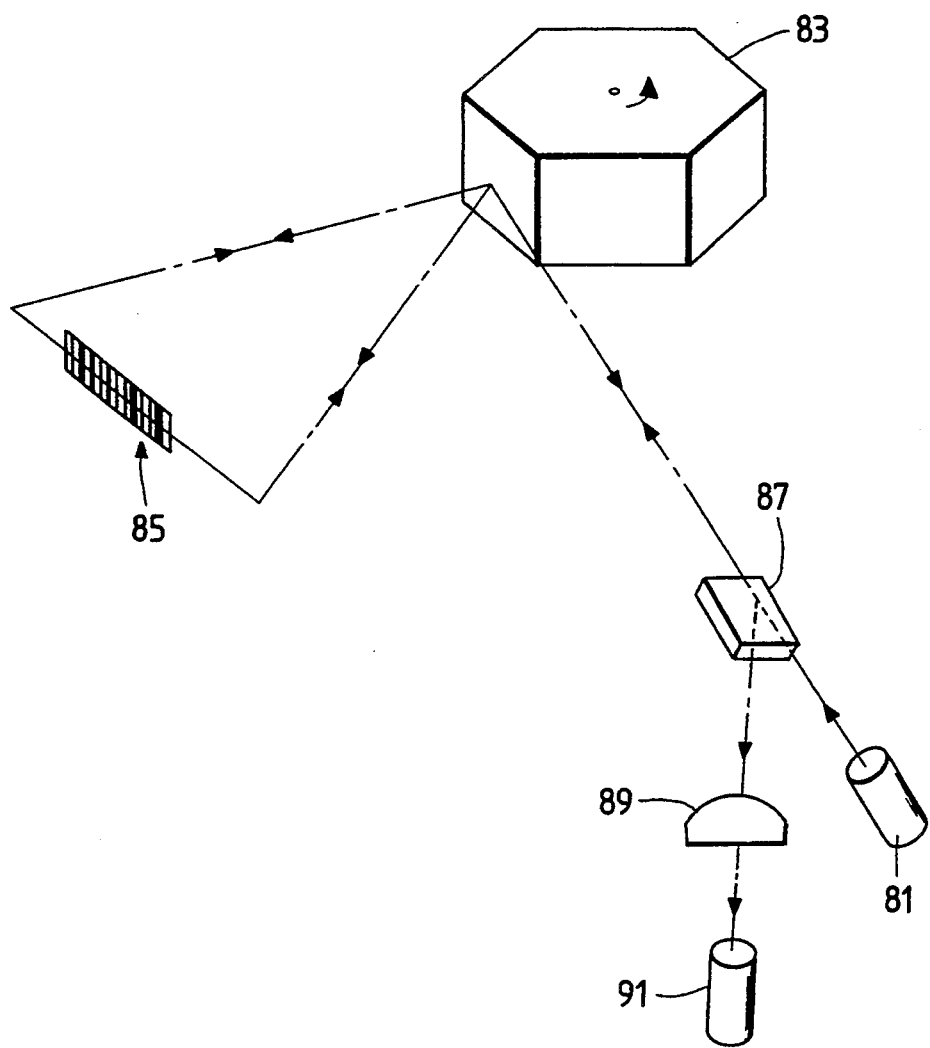
FIG. 1 is a schematic perspective view of an optical system of a conventional bar code reader.

Since the scanning mirror 14 is positioned behind the concave mirror 20, as shown in FIG. 4, the laser beam traveling from the scanning mirror 14 to the bar code label 10 and the reflected laser beam traveling from the bar code label 10 to the concave mirror 20 and then to the photodetector 18 occupy substantially the same optical path. The optical system shown in FIG. 4 is therefore much simpler in structure than the optical system of the conventional bar code reader which employs a polygonal mirror and a semireflecting mirror, as shown in FIG. 1. Inasmuch as the concave mirror 20 is fixedly mounted on the circuit board 9 and only the scanning mirror 14 is actuated, the bar code reader according to the present invention has a smaller mirror driver than that of the conventional bar code reader in which the converging mirror is also actuated. Consequently, the bar code reader according to the present invention is smaller and lighter than the conventional bar code readers.

The scanning mirror 14 of the resonant scanner 16 can be actuated without any electric motor. Therefore, the mirror driver may be relatively small and light, and consumes a relatively small amount of electric energy. As the scanning mirror 14 may be small, it can scan the bar code label 10 at a high scanning rate. The movable parts of the resonant scanner 16 may be light, they may be made highly resistant to external shocks.

The signal-to-noise-ratio of the signal produced by the photodetector 18 is relatively high as the laser beam reflected by the scanning mirror 14 toward the bar code label 10 and the laser beam reflected by the bar code label 10 toward the concave mirror 20 travel along substantially the same optical path. In the case where the concave mirror 20 and the resonant scanner 16 are integrally coupled to each other, the optical path can be adjusted before they are mounted on the circuit board 9, and they can be installed on the circuit board 9 with ease.

Instead of defining the hole 22 in the concave mirror 20 as shown in FIG. 4, the mirror coating of the concave mirror 20 may be peeled-off at its central area for allowing the laser beam from the laser beam source 12 to pass therethrough to the scanning mirror 14.

Figure 6:
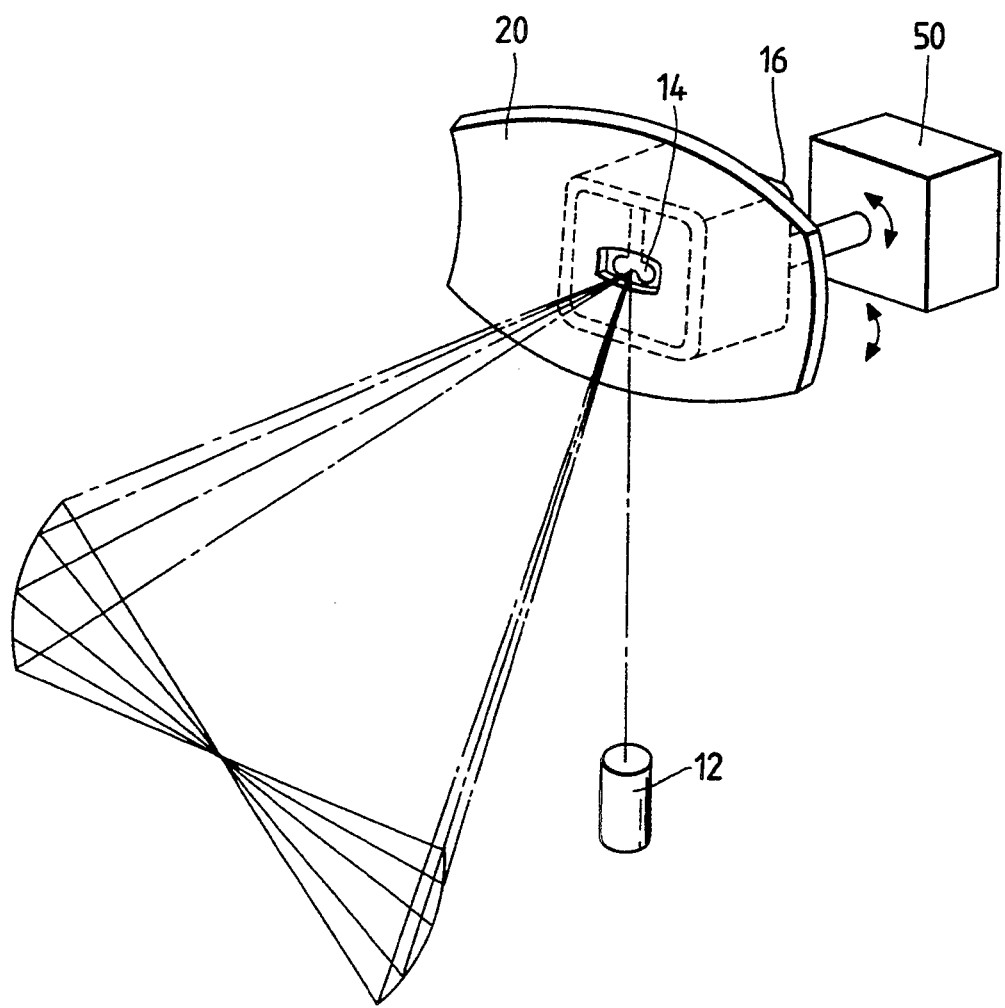
FIG. 6 is a schematic perspective view of an optical system of a bar code reader according to another embodiment of the present invention, the bar code reader being capable of scanning a surface in different directions.
Figure 7:
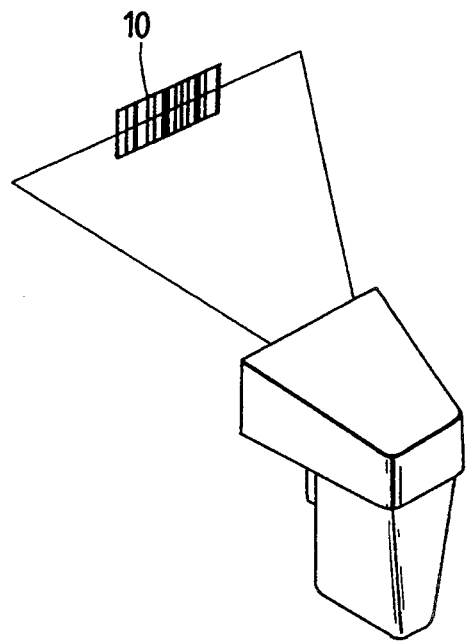
FIGS. 7 and 8 are perspective views showing different modes of use of the bar code reader shown in FIG. 6.
Figure 8:
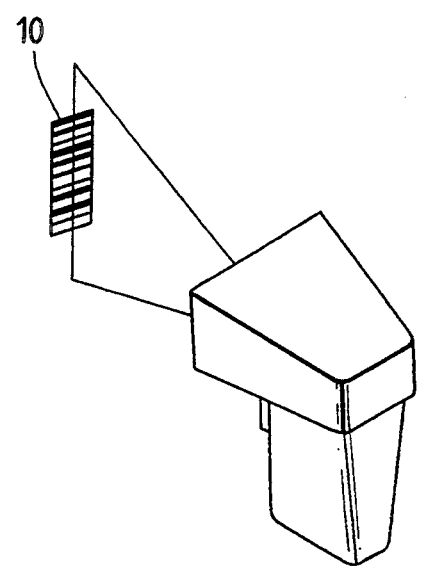

FIG. 6 shows an optical system of a bar code reader according to another embodiment of the present invention. The optical system shown in FIG. 6 is similar to the optical system shown in FIG. 4 except that the concave mirror 20 and the resonant scanner 16 are integrally coupled to each other and can be angularly moved in the directions indicated by the arrows about a horizontal axis extending through the center of the scanning mirror 14 by a step motor 50 that is disposed behind and joined to the resonant scanner 16. When the concave mirror 20 and the resonant scanner 16 are horizontally directed as shown in FIG. 6, the bar code reader can scan the bar code label 10 in a horizontal direction as shown in FIG. 7. When the concave mirror 20 and the resonant scanner 16 are angularly moved 90° from the horizontal position into a vertical position by the step motor 50, the bar code reader can scan the bar code label 10 in a vertical direction as shown in FIG. 8.

Figure 9:
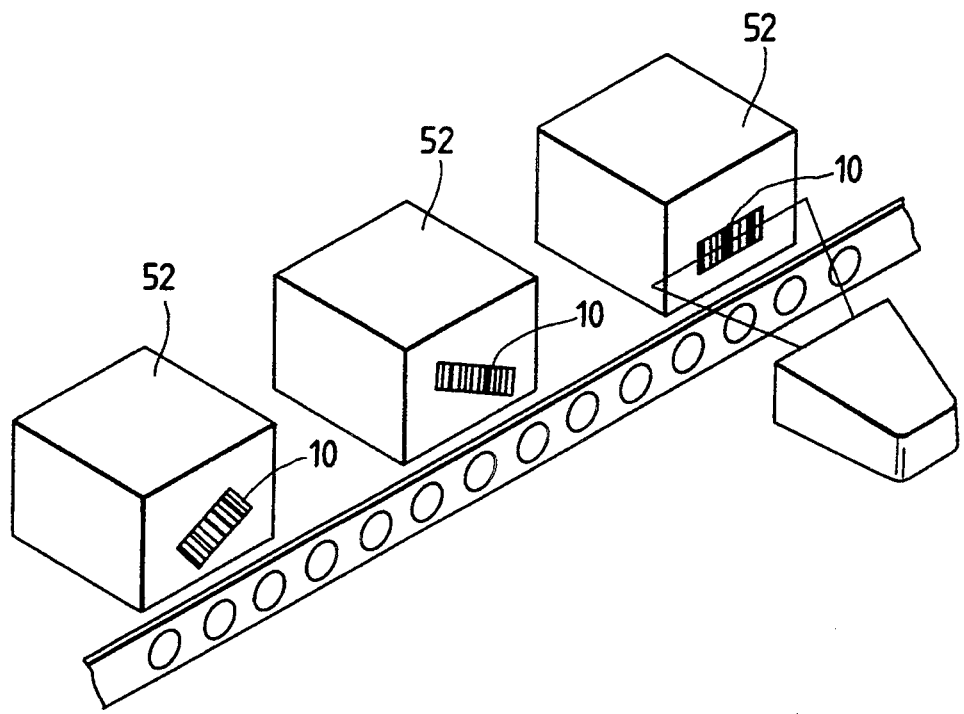
FIG. 9 is a fragmentary perspective view of a product delivery system incorporating the bar code reader shown in FIG. 6.

Preferably, the bar code reader shown in FIG. 6 may be incorporated in a product delivery system, as shown in FIG. 9, which automatically sorts out packaged products 52 based on the information indicated by bar codes printed on bar code labels 10 that are applied to the respective packaged products 52. In the product delivery system, when each packaged product 52 arrives at a detecting position right in front of the bar code reader, the step motor 50 is controlled based on the information representing the orientation of the bar code label 10 on the packaged product 52, for angularly moving the concave mirror 20 and the resonant scanner 16 into an angular position to scan the bar code label 10 on the packaged product 52 in the direction parallel to the bar code label 10. In this manner, each of the bar code labels 10 on the packaged products 52 that have reached the detecting position can accurately be read by the bar code reader without error.

Figure 10:
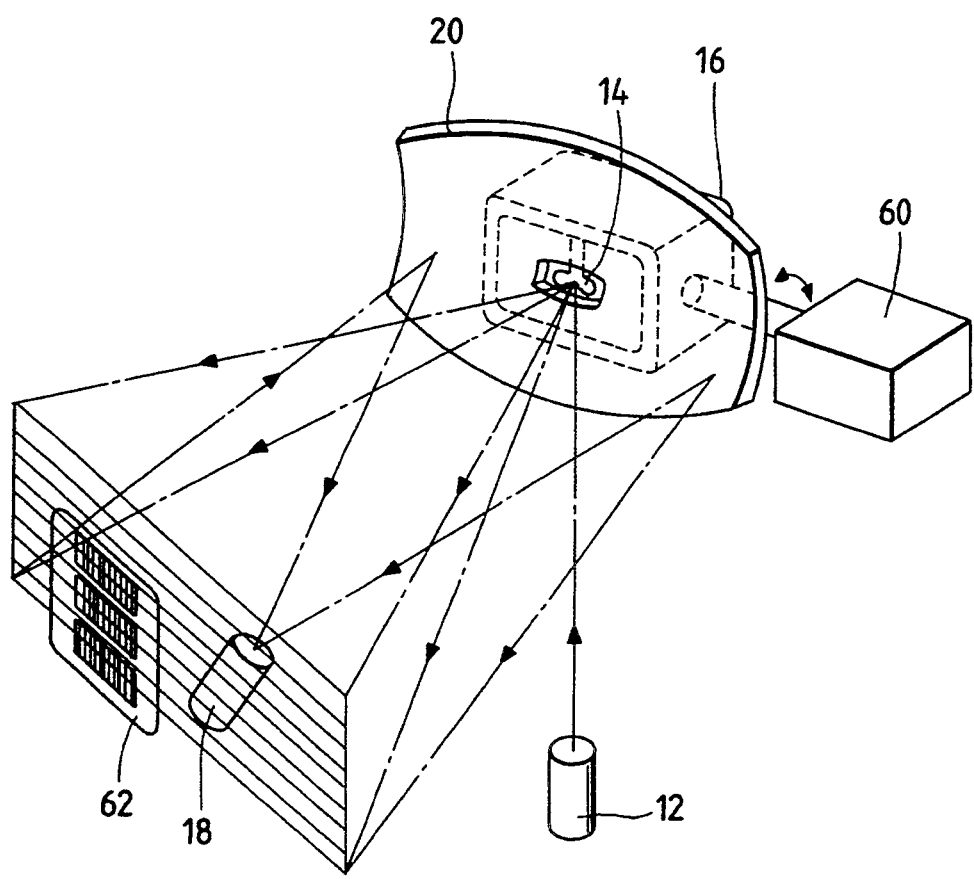
FIG. 10 is a schematic perspective view of an optical system of a bar code reader according to still another embodiment of the present invention, the bar code reader being capable of scanning a surface in a raster scanning mode.

FIG. 10 illustrates an optical system of a bar code reader according to still another embodiment of the present invention. The optical system shown in FIG. 10 is similar to the optical system shown in FIG. 4 except that the concave mirror 20 and the resonant scanner 16 are integrally coupled to each other and can be angularly moved by a step motor 60 in the directions indicated by the arrows about a horizontal axis extending behind and parallel to the scanning mirror 14 by a step motor 60 that is disposed laterally of and joined to the resonant scanner 16. When the the concave mirror 20 and the resonant scanner 16 are angularly moved reciprocally about the horizontal axis by the step motor 60 at a frequency smaller than the frequency at which the scanning mirror 14 is oscillated, the bar code reader can scan a surface in a raster scanning mode. The bar code reader shown in FIG. 10 is particularly advantageous in that it can read a bar-code label 62 printed with a plurality of (three in the illustrated embodiment) horizontal juxtaposed bar codes.

Figure 11:
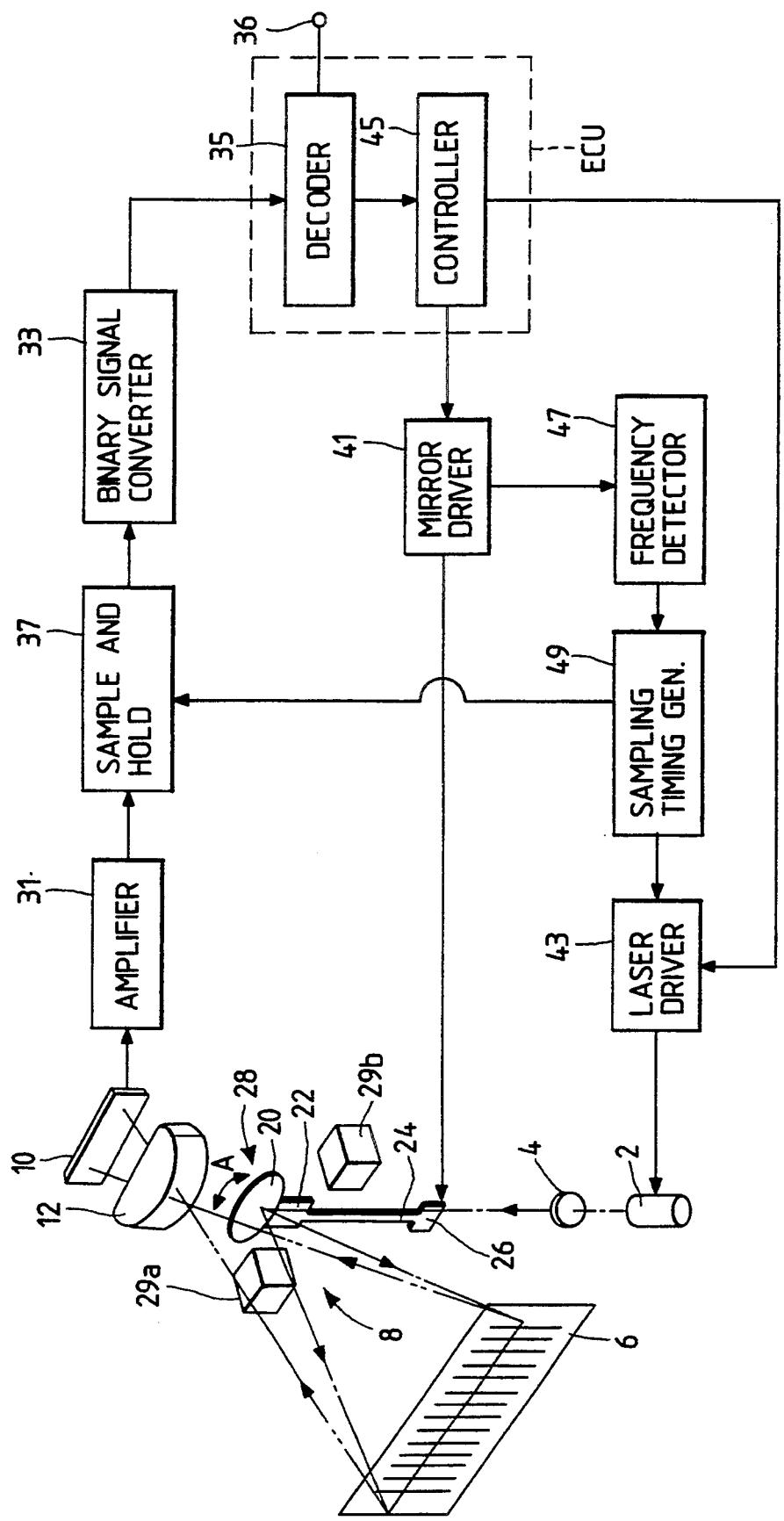
FIG. 11 is a schematic perspective view, partly in block form, of a bar code reader according to a further embodiment of the present invention.

FIG. 11 shows, partly in block form, a bar code reader according to a further embodiment of the present invention.

Figure 2:
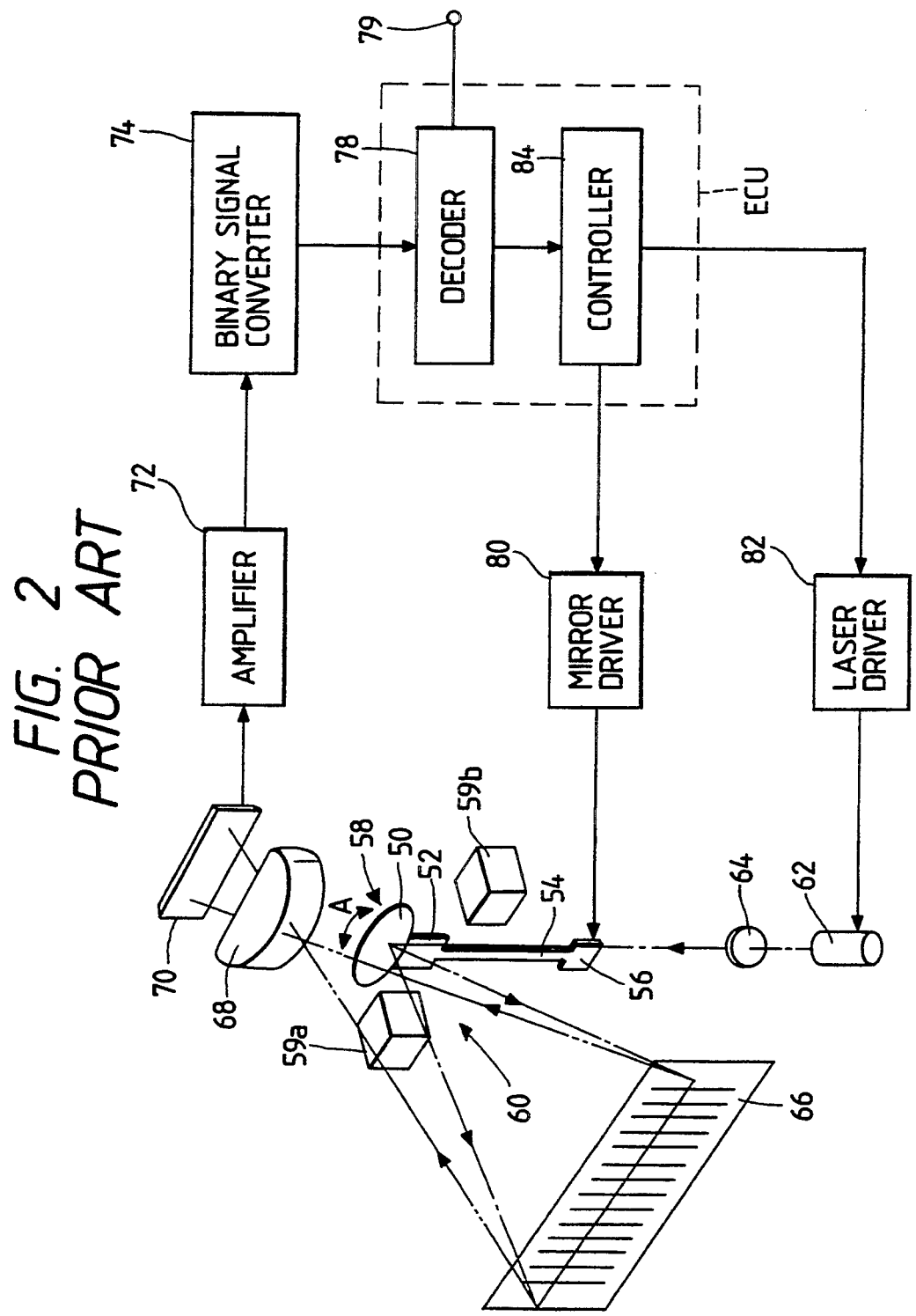
FIG. 2 is a schematic perspective view, partly in block form, of a conventional resonant scanner.

The bar code reader shown in FIG. 11 includes an optical system which is essentially identical to the optical system of the conventional bar code reader shown in FIG. 2. More specifically, optical system includes a laser beam source 2 for emitting a laser beam, a collimator lens 4 for converting the laser beam from the laser beam source 2 into a parallel laser beam, a crystal resonant scanner 8 for periodically deflecting the laser beam from the collimator lens 4 to scan a bar code label 6 printed with a bar code, a photodetector 10 for detecting a reflected laser beam from the bar code label 6 and producing an electric signal indicative of the intensity of the detected laser beam, and a condensing lens 12 for converging the reflected divergent laser beam from the bar code label 6 onto the photodetector 10.

More specifically, the laser beam source 2 comprises a laser beam emitter such as a laser diode, an He—Ne laser, or the like, a focusing lens in the form of a planoconvex lens, and an aperture. The photodetector 10 compries a photodetector element such as a photodiode, a phototransistor, or the like, and an optical filter which passes only an electromagnetic radiation having the same wavelength as that of the laser beam emitted by the laser beam source 2. If the laser beam emitter is a laser diode, the optical filter passes an electromagnetic radiation having a wavelength of 670 nm, and if the laser beam emitter is an He—Ne laser, the optical filter passes an electromagnetic radiation having a wavelength of 630 nm.

The resonant scanner 8 has a torsion resonator 28 composed of a mirror 20, a coil unit 22 with a coil (not shown) formed thereon, a torsion bar 24, and a fixed support 26, the torsion resonator 28 being made of crystal by photolithography and anisotropic etching. The resonant scanner 8 also has a pair of spaced magnets 29a, 29b for applying a magnetic field to the coil unit 22 disposed between the magnets 29a, 29b for thereby torsionally vibrating the torsion resonator 28 back and forth in the directions indicated by the arrows A. The scanning mirror 20 is coated with a thin film of gold to provide a reflectance of about 90% with respect to the laser beam emitted from the laser beam source 2.

The resonant scanner 8 includes a case (not shown) housing the various components of the torsion resonator 28 and the magnets 29a, 29b. For example, the case of the resonant scanner 8 may be composed of a housing and a cover which are similar to the housing 42 and the cover 44, respectively, shown in FIG. 5.

The bar code reader shown in FIG. 11 also includes an electric signal processing system. More specifically, the electric signal processing system includes an amplifier 31 for amplifying the electric signal produced by the photodetector 10, a sample-and-hold circuit 37 for sampling the amplified electric signal from the amplifier 31 at a certain sampling time and continuously holding the sampled signal until a next sampling time, a binary signal converter 33 for converting the sampled signal SV from the sample-and-hold circuit 37 into a binary signal, and a decoder for decoding the binary signal from the binary signal converter 33 into a decoded signal that is sent to an output terminal 36. The bar code reader also includes a driver system including a mirror driver 41 for actuating the resonant scanner 8 in a self-resonating mode, i.e., for energizing the coil of the coil unit 22 to turn the mirror 20 back and forth to deflect the laser beam, and a laser driver 82 for energizing the laser beam source 2. The decoder 35, the mirror driver 41, and the laser driver 43 are controlled by a control system including a controller 45. The decoder 35 and the controller 45 are in the form of an electronic control unit comprising a microcomputer having a CPU, a ROM, and a RAM.

The control system also includes a frequency detector 47 for detecting the frequency of vibration or oscillation of the torsion resonator 28 based on the drive signal that is supplied from the mirror driver 41 to the coil of the coil unit 22, and a sampling timing generator 49 responsive to a detected signal SA from the frequency detector 47 for generating a sampling signal SH which is applied to the sample-and-hold circuit 37 to enable it to sample the amplified signal from the amplifier 31 at a time indicated by the sampling signal SH.

The sampling signal SH generated by the sampling timing generator 49 is also applied to the laser driver 43 to cause the laser driver 43 to energize the laser beam source 2 to emit a laser beam while the laser driver 43 is being supplied with a control signal from the controller 45 for laser emission.

The torsion resonator 28 oscillates or vibrates back and forth under the interaction between a high-frequency current supplied to the coil of the coil unit 22 from the mirror driver 41 and a magnetic field generated by the magnets 29a, 29b. The impedance of the coil varies depending on the frequency at which and the angle through which the torsion resonator 28 oscillates. In order for the resonant scanner 8 to operate in the self-resonating mode, the coil of the coil unit 22 is supplied with a constant current from the mirror driver 41. Therefore, the mirror driver 41 comprises a constant-current regulated power supply circuit.

Figure 12:
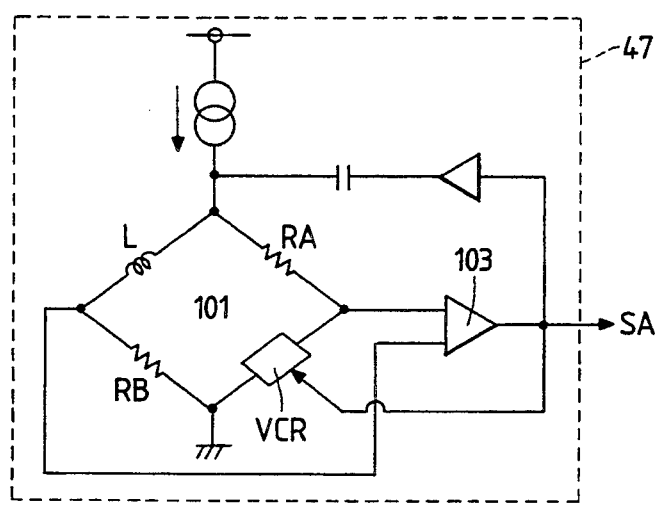
FIG. 12 is a circuit diagram of a frequency detector of the bar code reader shown in FIG. 11.

As described above, the torsion resonator 28 oscillates at its own resonant frequency in the self-resonating mode when driven by a constant current supplied from the mirror driver 41. As shown in FIG. 12, the frequency detector 47 comprises an impedance bridge 101 composed of the coil L of the torsion resonator 28, a variable resistor VCR, and fixed resistors RA, RB. The frequency detector 47 also has a differential amplifier 103 whose input terminals are connected to respective junctions between the coil L and the fixed resistor RB and between the fixed resistor RA and the variable resistor VCR. The differential amplifier 103 supplies a control signal through a feedback loop to the coil L so that the impedance bridge 101 will be in equilibrium. The control signal from the differential amplifier 103 is picked up as the detected signal SA representing the frequency of oscillation of the torsion resonator 28.

Since the impedance bridge 101 is driven by the mirror driver 41, the control signal from the differential amplifier 103 is applied to the current path that extends from the mirror driver 41 to the frequency detector 47. The impedance bridge 101 is held in equilibrium when the equation: $\{R+R(f)\} \times RVCR = RRA.RRB$ is satisfied where $R+R(f)$ is the impedance of the coil L, RVCR the impedance of the variable resistor VCR, and RRA, RRB the impedances of the fixed resistors RA, RB, respectively.

Figure 13:
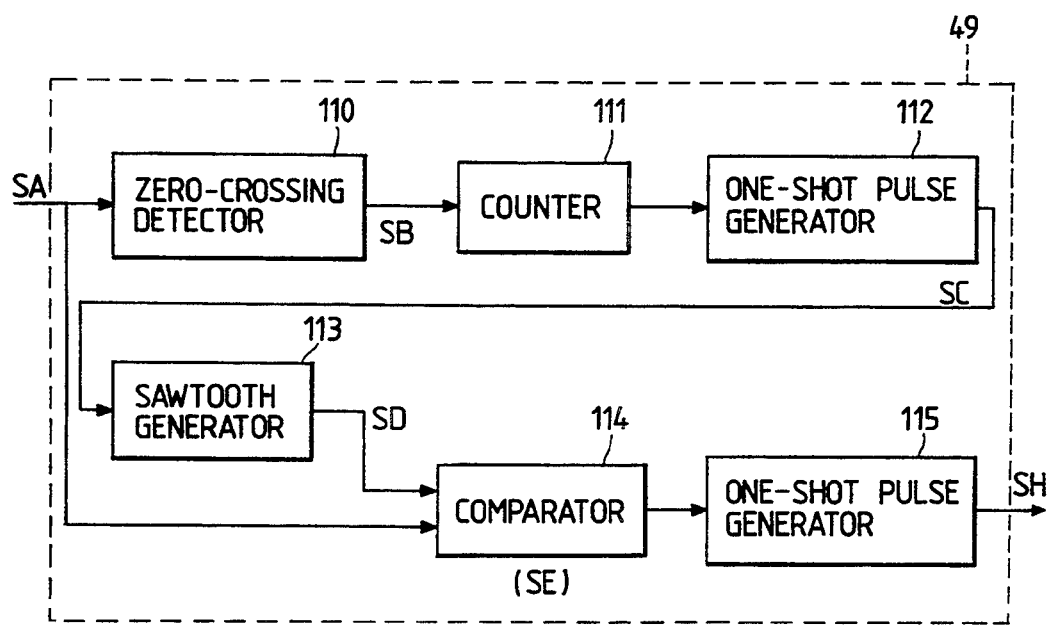
FIG. 13 is a block diagram of a sampling timing generator of the bar code reader shown in FIG. 11.

As shown in FIG. 13, the sampling timing generator 49 comprises a zero-crossing detector 110, a counter 111, a one-shot pulse generator 112, a sawtooth generator 113, a comparator 114, and another one-shot pulse generator 115. Twice in every oscillating cycle of the resonant scanner 8, or once in every unidirectional scanning stroke of the resonant scanner 8, the sampling timing generator 49 generates a sampling signal to enable the sample-and-hold circuit 37 to sample the amplified signal from the amplifier 31, which is representative of the reflected laser beam from the bar code label 6, at each of equally spaced points on the bar code label 6.

Figure 14:
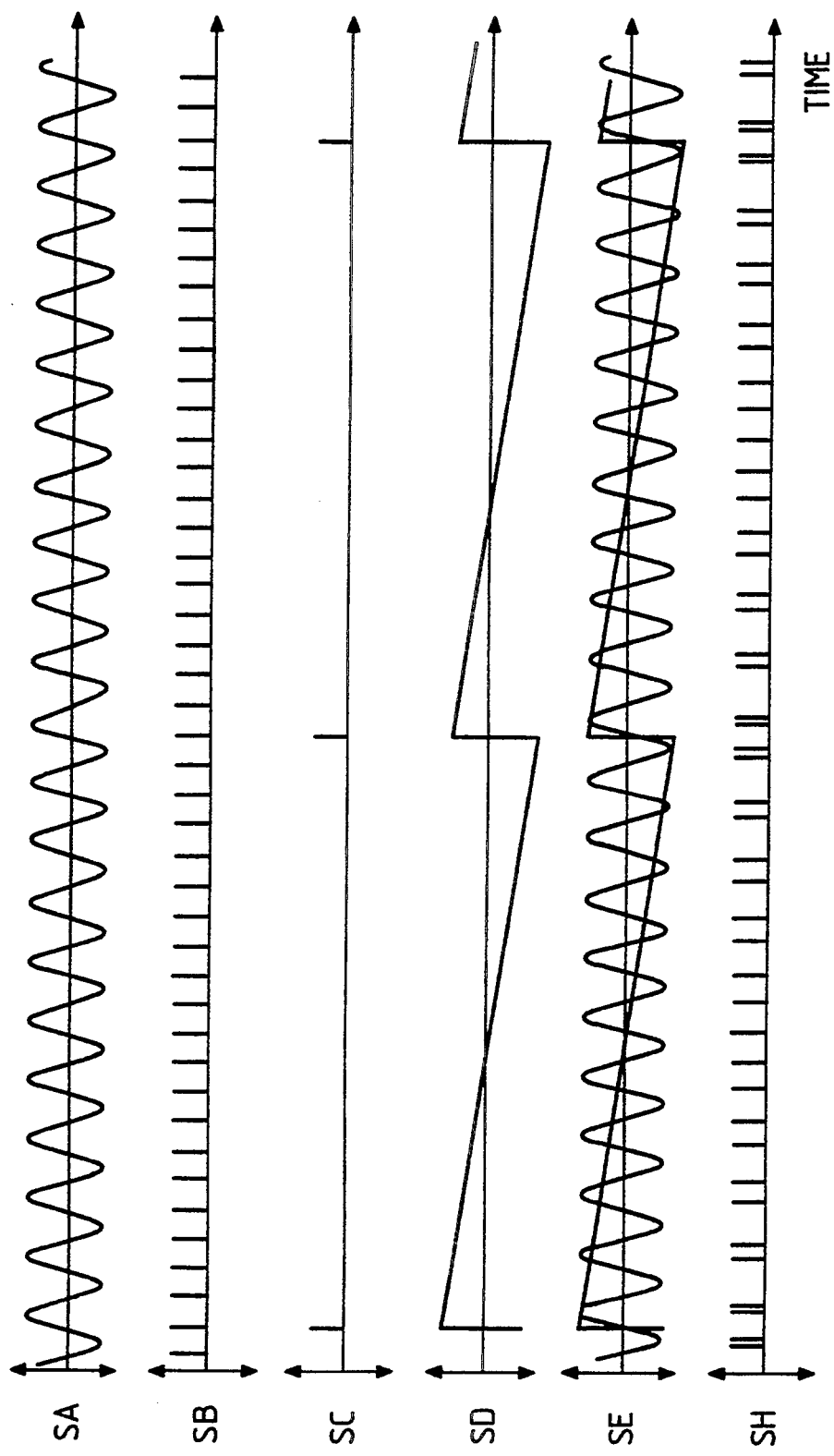
FIG. 14 is a timing chart illustrative of the manner in which the sampling timing generator operates.

The sampling timing generator 49 operates as follows: The frequency signal SA from the frequency detector 47 is applied to the zero-crossing detector 110. As shown in FIG. 14, the zero-crossing detector 110 generates a pulse signal SB each time the voltage level of the frequency signal SA is zero. The counter 111 counts pulse signals SB, and generates an output signal when the count reaches a predetermined value. In response to the output signal from the counter 111, the one-shot pulse generator 112 generates a pulse signal SC of a certain duration that is applied to the sawtooth generator 113.

The sawtooth generator 113 comprises a constant-current regulated power supply circuit, a capacitor, and a discharging switch. The discharge switch is turned on and off by the pulse signals SC from the one-shot pulse generator 112, for generating a sawtooth signal SD. More specifically, the capacitor starts being charged in response to a negative-going edge of a pulse signal SC, and is instantaneously discharged when the discharging switch is turned off in response to a positive-going edge of the pulse signal SC. The sawtooth signal SD-has a period corresponding to the period of the pulse signal SC.

The sawtooth signal SD generated by the sawtooth generator 113 is supplied to the comparator 114, which compares the voltage level of the sawtooth signal SD with the voltage level of the frequency signal SA which is also applied to the comparator 114, as indicated at SE in FIG. 14. The comparator 114 applies an output signal to the one-shot pulse generator 115, which generates a pulse signal (i.e., the sampling signal SH) each time the output signal from the comparator 114 is inverted.

Consequently, once in every unidirectional scanning stroke of the resonant scanner 8, the sampling timing generator 49 generates a sampling signal to enable the sample-and-hold circuit 37 to sample the amplified signal from the amplifier 31 at each of equally spaced points on the bar code label 6.

The sampling timing generator 49 is of the above circuit arrangement for the following reasons: Since the bar code label 6 is flat, the angular velocity of the rotating vector of the torsion resonator 28 and the scanning speed of the laser beam on the bar code label 6 are not the same as each other. If sampling signals were generated at equal time intervals In the scanning time, then the bar code information could not accurately be read from the sampled signal. According to the present invention, the sampling timing circuit 49 produces sampling signals at smaller time intervals as the angular displacement of the torsion resonator 28 about its central axis becomes larger.

As shown in FIGS. 16A through 16J the scanning mirror 20 of the torsion resonator 28 reciprocally oscillates or is cyclically angularly moved about its central axis at the resonant frequency of the torsion resonator 28. Such time the scanning mirror 20 is angularly moved in one direction (FIGS. 16A and 16B, for example), the sampling timing generator 49 generates sampling signals SH at equally spaced points on the bar code label 10. FIG. 15 shows the generation of a sampling signal SH in each of the scanning strokes of the scanning mirror 20 with respect to certain bars of the bar code label 10. The generated sampling signals SH enable the laser driver 43 to energize the laser beam source 2 to emit a laser beam and also enable the sample-and-hold circuit 37 to sample the signal from the amplifier 31 and supply the sampled signal SV to the binary signal converter 33.

As a result, the binary signal converter 33 is supplied with the sampled signal SV which is the same as if the bar code label 6 were scanned by the laser beam at a rate lower than the resonant frequency of the torsion resonator 28. Consequently, the binary signal converter 33 and the decoder 35 may be of a low processing capability. Since the scanning mirror 20 is not required to be relatively large in size and weight for reducing the resonant frequency of the torsion resonator 28, the advantages of the resonant scanner 8 can be maintained.

In FIG. 15, the directions indicated along the horizontal axes of the signals SV, SH represent the directions in which the bar code label 6 is scanned by the laser beam. FIGS. 16A, 16C, 16E, 16G, and 16J show respective angular positions of the scanning mirror 20 at the time when respective nth sampling signals SH (n=1, 2, 3, 4, 5) are generated by the sampling timing generator 49.

In the optical system shown in FIG. 11, the laser beam emitted from the laser beam source 2 and reflected to the bar code label 6, and the laser beam reflected from the bar code label 6 to the photodetector 10 travel along different optical paths. The laser beam that falls on the photodetector 10 tends to be adversely affected by extraneous light. To prevent the laser beam from being adversely affected by extraneous light at the photodetector 10, the laser beam emitted by the laser beam source 2 may be modulated. In this case, the laser beam should be modulated out of synchronism with the sampling of the bar code signal by the sample-and-hold circuit 37 under the control of the sampling signal SH from the sampling timing generator 49.

The sampling timing generator 49 may comprise, instead of the illustrated circuit arrangement, a voltage-to-frequency converter for converting the frequency signal SA from the frequency detector 47 into a drain of pulses whose spaced intervals depend on the frequency signal SA, and such a train of pulses may be supplied to the sample-and-hold circuit 37 in each scanning stroke of the resonant scanner 8.

In FIG. 12, the frequency of oscillation of the torsion resonator 28 is detected based on a change in the impedance of the coil L of the torsion resonator 28. However, a photodetector may be positioned within the scanning range of the resonant scanner 8 for detecting the laser beam deflected thereby when the resonant scanner 8 is angularly moved through a certain angle, thereby to detect the scanning rate or frequency of oscillation of the torsion resonator 28.

Although certain preferred embodiments of the present invention have been shown and described in detail, it should be understood that various changes and modifications may be made therein without departing from the scope of the appended claims.

What is claimed is:

1. An optical information reading device comprising:
   light emitting means for emitting a first light beam;
   swinging means angularly movable for reflecting and angularly deflecting said first light beam to produce a scanning light beam to scan optical information;
   condensing means for converging a second light beam reflected off said optical information upon application of said scanning light beam to said optical information, said second light beam directly entering said condensing means, said light emitting means and said swinging means being disposed on opposite sides of said condensing means, said swinging means being movable relative to said condensing means; and
   reading means for reading said optical information based on an intensity of said second light beam after being converged by said condensing means.

2. An optical information reading device according to claim 1, wherein said swinging means comprises a crystal resonant scanner having a torsion vibrator which is cyclically torsionally vibrateable under a magnetic field applied thereto.

3. An optical information reading device according to claim 2, wherein said reading means comprises:
   light detecting means for detecting said second light beam converged by said condensing means and producing a detected signal representing said intensity of said second light beam;
   frequency detecting means for detecting a frequency of vibration of said torsion vibrator;
   sampling signal generating means for generating a sampling signal based on said frequency detected by said frequency detecting means;
   sample-and-hold means for sampling said detected signal produced by said light detecting means based on said sampling signal generated by said sampling signal generating means; and
   decoding means for decoding said optical information based on said detected signal sampled by said sample-and-hold means.

4. An optical information reading device according to claim 3, wherein said light emitting means comprises means for emitting said first light beam only when a sampling signal is generated by said sampling signal generating means.

5. An optical information reading device according to claim 2, further comprising a driving means for actuating said swinging means, and wherein said reading means comprises:
   light detecting means for detecting said second light beam converged by said condensing means and producing a detected signal representing said intensity of said second light beam;
   frequency detecting means for detecting a frequency of angular movement of said swinging means, wherein said frequency detecting means comprises an impedance detecting means for detecting an impedance in said drive means which varies based on a rate of vibration of said swinging means;
   sampling signal generating means for generating a sampling signal based on said frequency detected by said frequency detecting means;
   sample-and-hold means for sampling said detected signal produced by said light detecting means based on said sampling signal generated by said sampling signal generating means; and
   decoding means for decoding said optical information based on said detected signal sampled by said sample-and-hold means.

6. An optical information reading device according to claim 5, wherein said light emitting means comprises means for emitting said first light beam only when a sampling signal is generated by said sampling signal generating means.

7. An optical information reading device as defined in claim 1, further comprises a housing, wherein said condensing means is rigidly attached to said housing and said swinging means is mounted within said housing for oscillating therein.

8. An optical information reading device comprising:
   light emitting means for emitting a first light beam;
   swingable means angularly movable for reflecting and angularly deflecting said first light beam emitted from said light emitting means to produce a scanning light beam to scan optical information, wherein said swingable means comprises a crystal resonant scanner having a torsion vibrator which is cyclically torsionally vibrateable under a magnetic field applied thereto;
   condensing means for converging a second light beam reflected off said optical information upon application of said scanning light beam to said optical information; and
   reading means for reading said optical information based on an intensity of said second light beam after being converged by said condensing means,- wherein said reading means comprises:
   light detecting means for detecting said second light beam converged by said condensing means and producing a detected signal representing said intensity of said second light beam;
   frequency detecting means for detecting a frequency of vibration of said vibrator;
   sampling signal generating means for generating a sampling signal based on said frequency detected by said frequency detecting means, wherein said sampling signal generating means comprises means for generating at least one sampling signal at a different time in each cycle of vibration of said vibrator based on said frequency detected by said frequency detecting means;
   sample-and-hold means for sampling said detected signal produced by said light detecting means based on said sampling signal generated by said sampling signal generating means; and decoding means for decoding said optical information based on said detected signal sampled by said sample-and-hold means.

9. An optical information reading device comprising:

light emitting means for emitting a first light beam;

a scanning mirror for reflecting said first light beam emitted by said light emitting means toward optical information;

driving means for angularly moving only said scanning mirror periodically in a predetermined direction for deflecting said reflected first light beam to produce a scanning light beam;

a condensing mirror for converging a second light beam which is reflected off said optical information upon application of said scanning light beam to said optical information;

light detecting means for detecting said second light beam converged by said condensing mirror and producing a detected signal representing an intensity of the detected reflected light beam; and reading means for reading said optical information based on said detected signal produced by said light detecting means;

said light emitting means being positioned in front of said condensing mirror;

said condensing mirror having an optical path for introducing said first light beam from said light emitting means to said scanning mirror and for allowing said scanning light beam reflected off said scanning mirror to travel toward said optical information.

10. An optical information reading device according to claim 9, wherein said scanning mirror comprises a torsion resonator oscillatable at its own resonant frequency.

11. An optical information reading device according to claim 10, further including:

frequency detecting means for detecting a frequency of oscillation of said torsion resonator;

sampling signal generating means for generating a sampling signal based on said frequency detected by said frequency detecting means; and sample-and-hold means for sampling said detected signal produced by said light detecting means based on said sampling signal generated by said sampling signal generating means, and applying said sampled signal to said reading means.

12. An optical information reading device according to claim 11, wherein said light emitting means comprises means for emitting said first light beam only when a sampling signal is generated by said sampling signal generating means.

13. An optical information reading device comprising:

light emitting means for emitting a first light beam;

a scanning mirror for reflecting said first light beam emitted by said light emitting means toward optical information, wherein said scanning mirror comprises a torsion resonator oscillatable at its own resonant frequency;

driving means for angularly moving said scanning mirror periodically in a predetermined direction for deflecting said reflected first light beam to produce a scanning light beam;

a condensing mirror for converging a second light beam which is reflected off said optical information upon application of said scanning light beam to said optical information, said condensing mirror having an optical path for introducing said first light beam from said light emitting means to said scanning mirror and for allowing said scanning light beam reflected off said scanning mirror to travel toward said optical information;

light detecting means for detecting said second light beam converged by said condensing mirror and producing a detected signal representing an intensity of the detected reflected light beam, said light emitting means being positioned in front of said condensing mirror;

reading means for reading said optical information based on said detected signal produced by said light detecting means;

frequency detecting means detecting a frequency of oscillation of said torsion resonator;

sampling signal generating means for generating a sampling signal based on said frequency detected by said frequency detecting means, wherein said sampling signal generating means comprises means for generating at least one sampling signal at a different time in each cycle of oscillation of said torsion resonator, based on said frequency detected by said frequency detecting means; and sample-and-hold means for sampling said detected signal produced be sail light detecting means based on said sampling signal generated by said sampling signal generating means, and applying said sampled signal to said reading means.

14. An optical system for optically scanning an optically detectable pattern of information with a first light beam and detecting a second light beam reflected off the optically detectable pattern, comprising:

light emitting means for emitting a first light beam;

a first mirror cyclically reciprocally oscillatable for reflecting and deflecting said first light beam to scan said optically detectable pattern;

a second mirror for converging a second light beam reflected off the optically detectable pattern upon scanning the optically detectable pattern with the first light beam reflected by said first mirror;

said light emitting means and said first mirror being disposed on opposite side of said second mirror and said second mirror having a hole defined substantially centrally therein so that said first light beam and said reflected first light beam pass through said hole, said first mirror being positioned adjacent to said hole; and light detecting means for detecting the light beam converged by said second mirror.

15. An optical system according to claim 14, wherein said light emitting means and said light detecting means are positioned in confronting relationship with respect to said first and second mirrors.

16. An optical system according to claim 14, further including a case housing said first mirror, said second mirror and said case being integral with each other.

17. An optical system according to claim 16, further including actuator means, coupled to said case, for angularly moving said first and second mirrors about an axis extending through said second mirror.

18. An optical system according to claim 16, further including actuator means, coupled to said case, for angularly moving said first and second mirrors about an axis extending parallel to said second mirror.

19. An optical system as defined in claim 14, wherein said hole has a size which is substantially equivalent to a size of said first mirror.

20. An optical information reading device comprising:
- light emitting means for emitting a first light beam;
- swingable means angularly movable for reflecting and angularly deflecting said first light beam emitted from said light emitting means to produce a scanning light beam to scan optical information, wherein said swingable means comprises a crystal resonant scanner having a torsion vibrator which is cyclically torsionally vibrateable under a magnetic field applied thereto;
- condensing means for converging a second light beam reflected off said optical information upon application of said scanning light beam to said optical information; and
- reading means for reading said optical information based on an intensity of said second light beam after being converged by said condensing means, wherein said reading means comprises:
  - light detecting means for detecting said second light beam converged by said condensing means and producing a detected signal representing said intensity of said second light beam;
  - frequency detecting means for detecting a frequency of angular movement of said swingable means;
  - sampling signal generating means for generating a sampling signal based on said frequency detected by said frequency detecting means, wherein said sampling signal generating means comprises means for generating at least one sampling signal at a different time in each cycle of vibration of said vibrator, based on said frequency detected by said frequency detecting means;
  - sample-and-hold means for sampling said detected signal produced by said light detecting means based on said sampling signal generated by said sampling signal generating means; and
  - decoding means for decoding said optical information based on said detected signal sampled by said sample-and-hold means.

21. An optical information reading device comprising:
- light emitting means for emitting a first light beam;
- swingable means angularly moveable for reflecting said first light beam in a first direction to produce a scanning light beam for scanning optical information and angularly deflecting said scanning light beam with respect to said first direction, wherein said swingable means comprises a crystal resonant scanner having a torsion vibrator which is cyclically torsionally vibrateable under a magnetic field applied thereto;
- condensing means for converging a second light beam reflected off said optical information upon application of said scanning light beam to said optical information; and
- reading means for reading said optical information based on an intensity of said second light beam after being converged by said condensing means,- wherein said reading means comprises:
  - photo sensor means for detecting said second light beam converged by said condensing means and producing a detected signal representing said intensity of said second light beam;
  - frequency detecting means for detecting a frequency of vibration of said vibrator;
  - sampling signal generating means for generating a sampling signal based on said frequency detected by said frequency detecting means, wherein said sampling signal generating means comprises means for generating at least one sampling signal at a different time in each cycle of vibration of said vibrator based on said frequency detected by said frequency detecting means;
  - sample-and-hold means for sampling said detected signal produced by said light detecting means based on said sampling signal generated by said sampling signal generating means and holding said detected signal sampled from said detected signal for a time period corresponding to one cycle of said crystal resonant scanner; and
  - decoding means for decoding said optical information based on said detected signal sampled by said sample-and-hold means.

22. A device for reading an optically detectable pattern of information, comprising:
- light emitting means for emitting a first light beam;
- scanning means cyclically reciprocally angularly oscillatable for angularly deflecting said first light beam emitted from said light emitting means to produce a scanning light beam to scan said optically detectable pattern, wherein said scanning means comprises a crystal resonant scanner having a torsion resonator which is torsionally oscillatable under a magnetic field applied thereto;
- light detecting means for detecting a second light beam which is reflected off said optically detectable pattern upon application of said scanning light beam to said optically detectable pattern, and producing an electric signal indicative of said second light beam; and
- electric signal processing means for producing sampled values of said electric signal produced by said detecting means and reading said optically detectable pattern based on said sampled values, wherein said electric signal processing means comprises:
  - frequency detecting means for detecting a frequency at which said torsion resonator oscillates;
  - sampling signal generating means for generating a sampling signal based on said frequency detected by said frequency detecting means, wherein said sampling signal generating means comprise means for generating at least one sampling signal at a different time in each cycle of oscillation of said torsion resonator, based on said frequency detected by said frequency detecting means;
  - sample-and-hold means for sampling said electric signal based on said sampling signal generated by said sampling signal generating means; and
  - decoding means for decoding said electric signal from said sample-and-hold means to thereby read said optically detectable pattern.

23. A device according to claim 22, wherein said light emitting means comprises means for emitting said first light beam only when a sampling signal is generated by said sampling signal generating means.

24. A device for reading an optically detectable pattern of information, comprising:
- light emitting means for emitting a first light beam;
- scanning means cyclically reciprocally angularly oscillatable for angularly deflecting said first light beam emitted from said light emitting means to produce a scanning light beam to scan said optically detectable pattern;

light detecting means for detecting a second light beam which is reflected off said optically detectable pattern upon application of said scanning light beam to said optically detectable pattern, and producing an electric signal indicative of said second light beam, wherein first data corresponding to a first position on said optically detectable pattern is obtained during a first scanning cycle of said scanning means and second data corresponding to a second position on said optically detectable pattern is obtained during a second scanning cycle of said scanning means, said first and second data corresponding to positions on said optically detectable pattern being adjacent one another; and electric signal processing means for producing sampled values of said electric signal produced by said detecting means and reading said optically detectable pattern based on said sampled values, wherein said sampled values are those values obtained at each position on said optically detectable pattern during each scanning cycle of said scanning means.

25. A device according to claim 24, wherein said scanning means comprises a crystal resonant scanner having a torsion resonator which is torsionally oscillatable under a magnetic field applied thereto.

26. A device according to claim 25, wherein said electric signal processing means comprises:

frequency detecting means for detecting a frequency at which said torsion resonator oscillates;

sampling signal generating means for generating a sampling signal based on said frequency detected by said frequency detecting means;

sample-and-hold means for sampling said electric signal based on said sampling signal generated by said sampling signal generating means; and decoding means for decoding said electric signal from said sample-and-hold means to thereby read said optically detectable pattern.

* * * * *